Jan. 1, 1924

R. E. MARBURY

WIRELESS RECEIVING SYSTEM

Filed March 5, 1921  2 Sheets-Sheet 1

1,479,146

WITNESSES:
P. H. Crocke.
H. L. Godfrey

INVENTOR
Ralph E. Marbury.
BY
Wesley G. Carr
ATTORNEY

Jan. 1, 1924
R. E. MARBURY
WIRELESS RECEIVING SYSTEM
Filed March 5, 1921 — 2 Sheets-Sheet 2
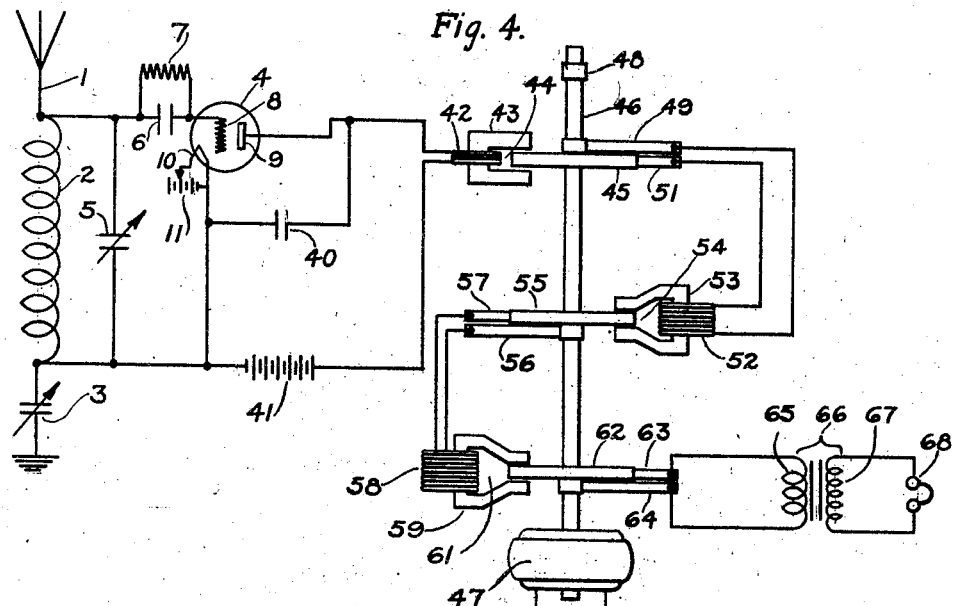
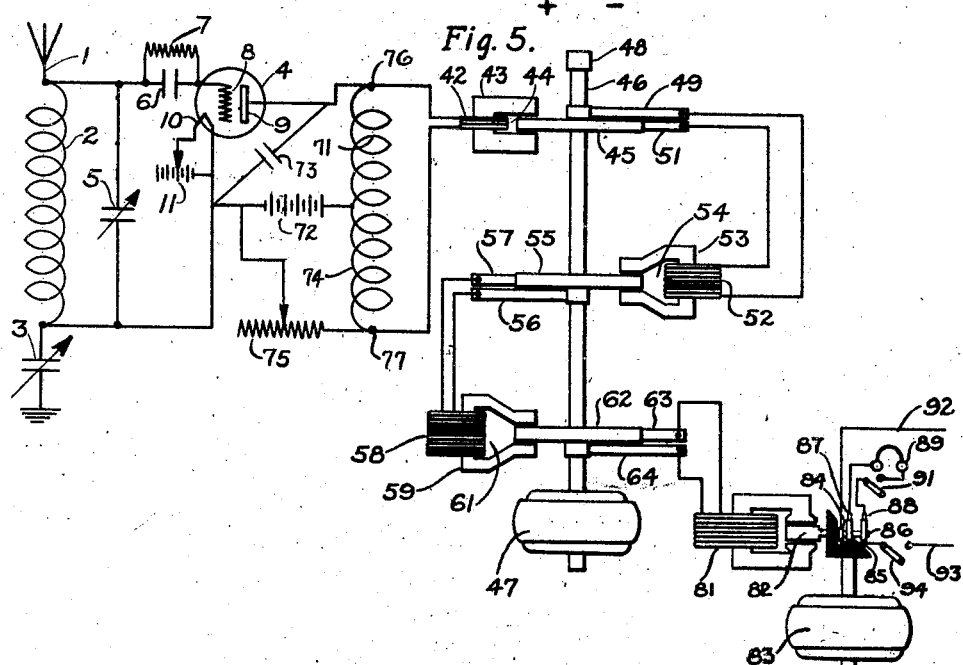
WITNESSES:
T. H. Crock.
H. L. Godfrey
INVENTOR
Ralph E. Marbury.
BY
Wesley G. Carr
ATTORNEY Patented Jan. 1, 1924.

1,479,146

UNITED STATES PATENT OFFICE.

RALPH E. MARBURY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

WIRELESS RECEIVING SYSTEM.

Application filed March 5, 1921. Serial No. 449,649.

*To all whom it may concern:*

Be it known that I, RALPH E. MARBURY, a citizen of the United States, and a resident of Edgewood Park, in the county of Allegheny and State of Pennsylvania, have invented a new and useful Improvement in Wireless Receiving Systems, of which the following is a specification.

My invention relates to means for amplifying received signal currents and particularly to means for amplifying received radio-signal currents, and it is applicable to either radio telephony or telegraphy and for the receipt of either damped or undamped waves.

One object of my invention is to amplify received signals in terms of applied mechanical power.

Another object of my invention is to change the flux in a dynamo-electric machine by means of signal currents to produce an amplified signal-current effect in the output of the machine.

A still further object is to devise apparatus that is simple in construction, durable and suitable for accomplishing the above named objects.

For the amplification of current effects, such as received signal currents, amplifier vacuum tubes are customarily employed. The receiving circuits of vacuum tubes, operating as amplifiers, comprise plate and filament batteries and a grid battery or a grid-leak resistance and condenser, which, together with the means for coupling the circuits, tends to complicate the apparatus. The vacuum tubes are quite delicate and subject to breakage, and, particularly where subjected to sudden shocks and jars, the elements within the tube may be displaced, whereby the tube is rendered inoperative. This often occurs when vacuum-tube amplifiers are used in places where the apparatus receives heavy jolting, as in war tanks or aeroplanes. Not only is the above true, but the life of vacuum tubes under the most ideal conditions is comparatively limited.

In the use of my invention, the rectified signal current produces magnetic effects in a dynamo-electric machine, and these magnetic effects produce greatly amplified changes in the output of the dynamo-electric machine by reason of the mechanical power applied to the rotor of a machine.

In one form of my apparatus, I employ a receiving circuit connected to the grid of a three-electrode vacuum tube in which the received current operates to change the potential of the grid of the tube. Connected in the plate circuit of the tube is a magnetizing winding on the stator of a dynamo-electric machine. The machine has another balancing magnetizing winding on its stator, and the current from the plate battery of the vacuum tube traverses the two balanced magnetizing windings in opposite directions, normally producing no magnetization of the stator.

A variable resistance may be adjusted to so balance the fields of the two magnetizing windings that they will cancel each other.

A condenser, operating as a by-pass for radio frequency, is shunted across the plate and filament of the electron tube.

Means for rotating the rotor of the dynamo-electric machine and means for detecting the current induced therein are provided. Current will be induced only upon the receipt of incoming signals which disturb the balancing of the two magnetizing windings on the stator.

The above outlined system is typical of one which may be employed for the receipt of undamped or unheterodyned telegraphic signals.

Where damped signals are received, it is unnecessary to use balancing magnetizing windings on the stator since a change in the normal current output of the dynamo-electric machine may be easily detected. I may employ, if found necessary, means comprising saturation coils to bring the stator to a degree of magnetization close to the knee of the saturation curve so that received signals of unusual loudness or static will be damped out.

In other forms of apparatus embodying my invention to avoid the generator ripple, I may use homopolar machines, and for greater amplification, I may cascade the same.

In the drawings:

Figure 1 illustrates diagrammatically a system for the receipt of undamped telegraphic signals.

Fig. 2 diagrammatically illustrates a modification of the scheme shown in Fig. 1, adapted to the receipt of damped, heterodyned or speech signals.

Fig. 4 shows, diagrammatically, a system in which homopolar generators are used to avoid the generator ripple and cascaded to obtain a multiplied amplification of the received signal current.

Fig. 5 illustrates, diagrammatically, a modification of the scheme shown in Fig. 4, which is adapted for the receipt of undamped telegraphic signals.

Figure 1:
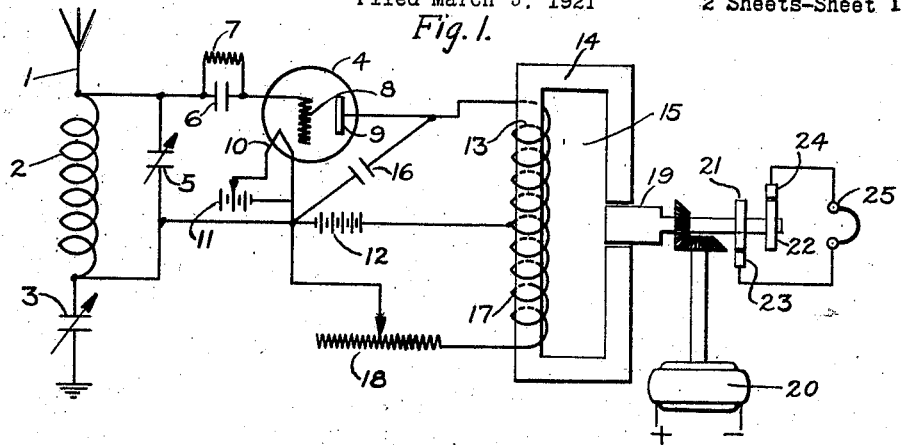

Referring to Fig. 1, I have shown an antenna circuit comprising an antenna 1, an inductance device 2, and a variable capacitance device 3 by means of which the antenna system may be tuned to any desired frequency. The grid circuit of a three-electrode vacuum-tube 4 is conductively coupled to the inductance device 2. The inductance device 2 is shunted by a variable capacitance device 5 by means of which the grid circuit may be tuned to the desired frequency. Within the grid circuit is located a grid condenser 6 shunted by a grid-leak resistor 7, for performing the function of maintaining the grid at a negative value, as is the customary practice in the use of three-electrode vacuum tubes as amplifiers of received signals. The vacuum tube 4 has a grid element 8, a plate element 9, and a filament 10, which last is heated by a filament battery 11. A plate battery 12 supplies current for the plate circuit of the vacuum tube 4.

Located within the plate circuit of the vacuum tube 4 is a magnetizing winding 13, upon a stator 14 of a dynamo-electric machine 15. The filament 10 and the plate element 9 are shunted by a condenser 16, acting as a by-pass for radio frequency. Likewise located upon the stator 14 is a second magnetizing winding 17 through which current from the plate battery 12 flows in the opposite direction from the flow of the current through the magnetizing winding 13. By means of a suitable resistance 18 in the circuit comprising the magnetizing winding 17, the magnetizing effect of the magnetizing winding 13 may be normally balanced by the effect of the winding 17.

The dynamo-electric machine 15 is provided with a rotor 19 driven by means of an electric motor 20, or any other suitable source of power. The rotor 19 is provided with collector rings 21 and 22, upon which brushes 23 and 24 are adapted, respectively, to bear. Telephone receivers 25 are connected in the circuit comprising the brushes 23 and 24.

This form of apparatus is particularly adapted to receive undamped telegraphic signals. When the antenna circuit comprising the antenna 1, the inductance device 2 and the variable capacitance device 3 is tuned to the frequency of the undamped wave to be received, oscillations are set up in the grid circuit of the three-electrode vacuum tube 4, which is conductively connected to the inductance device 2 and is tuned to the desired frequency by varying the capacitance of device 5.

The potential of the grid 8 is varied in accordance with the oscillations received, and the effect of the change in grid potential is amplified in the plate circuit of the tube. The vacuum tube 4 operates not only as an amplifier but as a rectifier of the received signals. The unidirectional amplified signal current flowing in the magnetizing winding 13, located in the plate circuit of the tube 4, causes the balance between the magnetizing windings 13 and 17 to be disturbed so that the stator 14 becomes magnetized. As soon as lines of magnetic force are set up in the stator 14 there is an output from the rotor 19. The speed of the rotation of the rotor is approximately such that one thousand cycles will be impressed on the telephone receivers. The output is greatly magnified by reason of the application of mechanical power to the rotor 19 through the motor 20, and a greatly amplified signal is heard in the telephone receivers 25 connected through brushes 23 and 24 to the collector rings 21 and 22, respectively, of the rotor 19.

If, in any particular case, the residual magnetism interferes with the balancing of the two balancing inductances 13 and 17, it is practically feasible to accomplish the balancing at the phone end by means of a two-winding transformer having a middle point through which the telephone receivers may be connected.

Since the magnetizing current of a dynamo-electric machine, operating as a generator, is only a small per cent of the output current, there is, in a system such as I have just described, a tremendous amplification of signal current, for, in my invention, the signal current is the magnetizing current, and the application of mechanical power to the rotor accomplishes the amplification.

Figure 2:
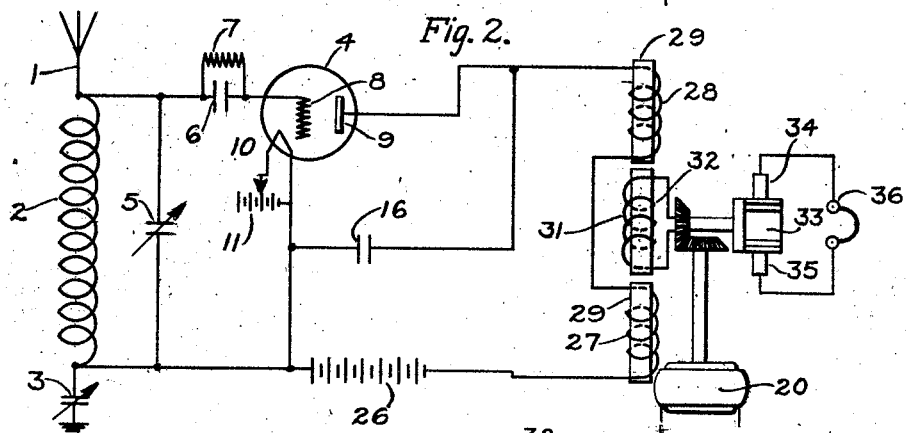

Referring to Fig. 2, I have diagrammatically shown a modification for the receipt of damped, heterodyned or telephonic signals, in some respects similar to the scheme illustrated in Fig. 1. The receiving or input circuit of the three-electrode vacuum tube 4 is the same but the plate circuit of the tube comprises a plate battery 26 and inductive windings 27 and 28. The inductive windings 27 and 28 are located on the stator 29 of a dynamo-electric machine 31 having a rotor 32 and a commutator 33. Brushes 34 and 35 collect the current from the commutator 33, and telephone receivers 36 are connected across the brushes 34 and 25.

In operation, there is normally a constant plate current flowing in the plate circuit of the vacuum tube 4, which, by reason of the rotation of the rotor 32, through power derived from the motor 20, gives a constant current through the telephone receivers 36. This current, being constant, produces no audible effect in the telephone receivers. However, upon receipt of a spark, heterodyned or voice signal in the antenna circuit, the current flowing in the plate circuit of the electron tube 4 is varied in accordance with the incoming signal. The signal current is rectified and amplified by the vacuum tube 4, and there will be a change in the magnetic flux in the stator 29, by reason of the added signal current flowing in the inductance windings 27 and 28. The effect of this signal current will be amplified in the rotor circuit, by reason of the power applied to the rotor, and a greatly amplified signal will be heard in the telephone receivers 36.

Figure 3:
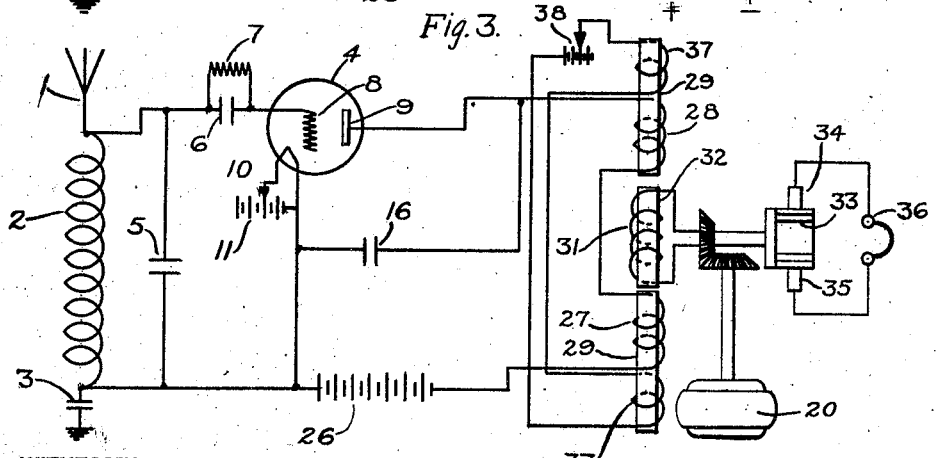
Fig. 3 is a diagrammatic illustration of a modification of the scheme shown in Fig. 2, in which means for damping out signals of unusual loudness or static is shown.

In Fig. 3 I have shown a system similar to the system shown in Fig. 2. In this modification, I have shown auxiliary windings 37 wound on the stator 29 and a source of direct current 38 which may be regulated to any desired value for supplying current to the windings 37.

The purpose of the windings 37 is to adjust the degree of saturation of the stator 29 to a point near the knee of the saturation curve, so that unusually loud signals or static may be damped out in the telephone receivers 36. When operating beyond the knee of the saturation curve, a large increase in magnetizing force makes but a small increase in flux, and, therefore, static or unusually loud received signals will not cause an undue increase in the current flowing in the rotor circuit which comprises the telephone receivers.

In the scheme illustrated in Fig. 4, I employ antenna circuits and vacuum-tube circuits somewhat similar to those shown in the other modifications. In this modification, the plate circuit of the vacuum tube 4 comprises a condenser 40 acting as a by-pass for radio frequency, a plate battery 41 and inductive windings 42 located upon a stator 43 of a homopolar generator 44. The homopolar generator 44 has a rotor 45 mounted on a shaft 46. The shaft 46 is rotated by an electric motor 47 or any other suitable source of power and is journalled, at its end opposite the rotor 47, in a bearing 48.

Contacting with the rotor 45 of the homopolar generator 44 are brushes 49 and 51 connected in circuit with an inductive winding 52 on a stator 53 of a homopolar generator 54. The homopolar generator 54 has a rotor 55 mounted upon the shaft 46. Contacting with the rotor 55 are brushes 56 and 57, connected in circuit with an inductive winding 58 wound on a stator 59 of a third homopolar generator 61. Mounted on the shaft 46 is a rotor 62 of the homopolar generator 61. In contact with the rotor 62 are brushes 63 and 64 connected in circuit with an inductance device 65 forming the primary of an audio-frequency transformer 66. The secondary circuit of the audio-frequency transformer 66 comprises a secondary inductance 67 and telephone receivers 68.

Under normal conditions, when no signal is being received, there is a normal flow of plate current in the plate circuit of the vacuum tube 4. This produces, through the inductive winding 42 on the stator 43 of the homopolar generator 44, a constant magnetic field. By reason of the power applied to the shaft 46 through the motor 47, the rotor 45 is caused to rotate, and an amplified current is induced in the rotor 45 and collected by the brushes 49 and 51. This amplified current produces a magnetic field, through the inductive winding 52, in the stator 53 of the homopolar generator 54. The rotation of the rotor 55 of the generator 54 induces an amplified current in the rotor that is collected by the brushes 56 and 57, and this current through the inductive winding 58 induces a strong magnetic field in the stator 59 of the homopolar generator 61. Greatly amplified current is collected by the brushes 63 and 64 from the rotor 62 and this amplified current flows through the primary inductance 65 of the audio-frequency transformer 66. This current is of constant value, however, and, therefore, induces no current in the circuit comprising the secondary inductance 67 and the telephone receivers 68.

When signal current is received, the amount of current flowing in the inductance 42 of the plate circuit of the vacuum tube 4 is increased in accordance with the received oscillations. There will be an increase in the number of lines of magnetic flux in the stator 43 of the homopolar generator 44 in accordance with the strength of the signal. This increase in current is amplified through the homopolar generators 44 and 54, and 61 by reason of their cascading. The output of the homopolar generator 44 operates to increase the magnetizing current of the homopolar generator 54, which, in turn, increases the magnetizing current of the homopolar generator 61, and a tremendous amplification is accomplished by this cascading. The amplified signal current, consisting of spark, speech, or heterodyned received signals, induces greatly amplified oscillations in the primary inductance 65 of the audio-frequency transformer 66, and these oscillations are, in turn, induced in the circuit comprising the secondary inductance 67 and the telephone receivers 68.

By employing homopolar generators, I do away with all generator ripple, which, under certain conditions, may be objectionable in the form of apparatus shown in Figs. 2 and 3. By cascading the generators so that the current induced in the rotor of one machine furnishes the magnetizing current for the next machine, I obtain a greatly increased amplification of the received signal, and, in the scheme shown in Fig. 4, by mounting all of the rotors on one power shaft, I obtain strength and simplicity of construction.

In the scheme shown in Fig. 5 I have adapted the arrangement illustrated in Fig. 4 for the receipt of undamped telegraphic signals. In this arrangement, the plate circuit of the electron tube 4 comprises a balancing inductance 71, a plate battery 72 and a condenser 73 acting as a by-pass for radio-frequency oscillations. Connected to the plate battery 72 is a second balancing inductance 74. The amount of current flowing through the balancing inductance 74 is controlled by means of a variable resistance 75. By a suitable adjustment of the variable resistance 75, the points 76 and 77 may be normally adjusted to have the same potential, and, therefore, the inductive winding 42, connected across points 76 and 77 and located on the stator 43 of the first homopolar generator 44, will normally have no current flowing through it.

The connections between the homopolar generators are like those shown in Fig. 4. Connected to the brushes 63 and 64 of the last generator, is an inductive winding 81, upon a stator of a generator having a rotor 82. The rotor 82 is rotated by means of a motor 83 or any other suitable source of power. The speed of rotation of the rotor 82 is such that approximately a thousand cycles will be generated in the rotor circuit. The rotor is provided with a commutator 84 and collector rings 85 and 86. Contacting with the collector rings 85 and 86 are brushes 87 and 88, which are connected in circuit with telephone receivers 89.

A suitable switch 91 provides means for connecting the telephone receivers 89 in circuit with the collector rings or for breaking said circuit. Connected in circuit with the commutator 84 are leads 92 and 93 leading to a suitable recording apparatus, (not shown) for operating the same. A switch 94 provides means whereby the circuit may be broken through the recording apparatus. By closing the switch 91 and opening the switch 94, the telephone receivers may be used to catch the signal or by opening the switch 91 and closing the switch 94 the signal may be received by some suitable recording apparatus.

As before mentioned, when no signal is being received, by proper adjustment of the resistance 75, the points 76 and 77 may be made to have the same potential, and no current will flow through the magnetizing inductance 42, wound on the stator 43 of the first homopolar generator 44 in the series of cascaded homopolar generators. Hence, when no signal is received, there will be no current induced in any of the homopolar generators, and no current will then flow through the inductance 78 wound on the stator 79 of the generator 81. Under these conditions, no current will flow either in the telephone receivers or in the recorder connected in the recorder circuit.

When a signal of undamped waves is received, there will be a difference in potential between the points 76 and 77, and current will flow in the magnetizing inductance 42. This current will be amplified through the homopolar generators and will cause a greatly amplified current to flow in the magnetizing inductance wound on the stator of the generator 81. As before mentioned, the speed of rotation of the rotor 82 is approximately such that it will give a thousand cycles alternating current in case the circuit through the collector rings and telephone receivers 89 is closed. The amplified signal will be plainly audible in the telephone receivers. If desired, the switch 91 may be opened and the switch 94 closed, in which case, the direct current taken from the commutator 84 will flow through leads 92 and 93 to operate the recording mechanism.

Since I have not shown all the possible modifications of my invention which may be conceived by one skilled in the art, I desire that my invention shall be limited only by the showing of the prior art and by the scope of the appended claims.

I claim as my invention:

1. A system for amplifying received signal current comprising a source of unidirectional signal current, a dynamo-electric machine, a source of power operating the rotor of the machine, a steady source of excitation for said machine, and means affected by the unidirectional signal current for producing a change in magnetic flux in the machine to effect current output.

2. A system for amplifying received signal current comprising a dynamo-electric machine, a source of power operating the rotor of the machine, a steady source of excitation for said machine, and means for causing the signal current to produce a change in magnetic flux in the machine to effect the current output.

3. A system for the amplification of received signal current comprising a signal-current input circuit, a dynamo-electric machine having field and armature members, means for supplying a unidirectional excitation to said field member, means for causing the signal current to produce a change in magnetic flux in said field member, and an output circuit in circuit with said armature member for utilizing the resultant change in output of the machine.

4. In a telephone system, the combination with an input circuit carrying received telephone currents, of a dynamo-electric generator, means for driving said generator, a telephone receiver responsive to the output circuit of said generator, means for normally exciting said generator to cause the same to deliver a current incapable of audibly affecting said telephone receiver, and means responsive to said input circuit for varying the excitation of said generator.

5. A system for the amplification of received radio-signal current comprising a source of received signal current, a dynamo-electric machine having a stator and a rotor, an inductive winding on the stator in circuit with the rectified signal current, means for normally supplying a constant component of excitation to the stator, means for rotating the rotor, a commutator on the rotor, brushes for the commutator, a circuit connected across the brushes, and a telephone receiver operatively associated with said circuit.

6. A system for the amplification of received radio signal current comprising a receiving circuit, an electron tube in circuit with the receiving circuit for changing the potential of the grid of the tube, a dynamo-electric machine having a stator and a rotor, an inductive winding on the stator in circuit with the plate circuit of the electron tube, a plate battery, means to rotate the rotor, and means in circuit with the rotor for detecting a change in current output of the machine.

7. A system for the amplification of received signal current comprising a receiving circuit, an electron tube, means in circuit with the receiving circuit for changing the potential of the grid of the tube, a dynamo-electric machine having a stator and a rotor, inductive windings on the stator in circuit with the plate circuit of the electron tube, a plate battery, a condenser operating as a by-pass for radio frequency shunted across the filament and plate of the electron tube, means to rotate the rotor and means in circuit with the rotor for detecting a change in the current output of the machine.

8. A system for the amplification of received signal current comprising a receiving circuit, an electron tube, means in circuit with the receiving circuit for changing the potential of the grid of the tube, a dynamo-electric machine having a stator and a rotor, inductive windings on the stator in circuit with the plate circuit of the electron tube, a plate battery, a condenser operating as a by-pass for radio frequency shunted across the filament and plate of the electron tube, means to rotate the rotor, a commutator, brushes therefor and telephone receivers connected across the brushes.

9. A system for the amplification of received signal current comprising a source of rectified signal current, a dynamo-electric machine having a stator and a rotor, inductive windings on the stator in circuit with the rectified signal current, means to keep the stator at a point near saturation, means to rotate the rotor and means in circuit with the rotor for detecting a change in the current output of the machine.

10. A system for the amplification of received signal current comprising a source of rectified signal current, a dynamo-electric machine having a stator and rotor, inductive windings on the stator in circuit with the rectified signal current, auxiliary windings on the stator, means to regulate the current flowing through the auxiliary windings to keep the stator at a point near saturation, means to rotate the rotor and means in circuit with the rotor for detecting a change in current output of the machine.

11. A system for the amplification of received radio signal current comprising a receiving circuit, an electron tube, means in circuit with the receiving circuit for changing the potential of the grid of the tube, a dynamo-electric machine having a stator and a rotor, inductive windings on the stator in circuit with the plate circuit of the electron tube, auxiliary windings on the stator, means to regulate the current flowing through the auxiliary windings to keep the stator at a point near saturation, means to rotate the rotor and means in circuit with the rotor for detecting a change in current output of the machine.

12. A system for the amplification of received signal current comprising a receiving circuit, an electron tube, means in circuit with the receiving circuit for changing the potential of the grid of the tube, a dynamo-electric machine having a stator and a rotor, inductive windings on the stator in circuit with the plate circuit of the electron tube, auxiliary windings on the stator, means to regulate the current flowing through the auxiliary windings to keep the stator at a point near saturation, a condenser operating as a by-pass for radio frequency shunted across the filament and plate of the electron tube, means to rotate the rotor, a commutator, brushes therefor and telephone receivers connected across the brushes.

13. A system for the amplification of received signal current comprising a signal-current input circuit, a dynamo-electric machine having field and armature members, means for exciting said machine to a point near the knee of the magnetization curve and means for changing the excitation in accordance with said signal current, whereby the signal current is normally amplified at a substantially constant rate, but abnormally strong received impulses will carry the excitation beyond the knee of the magnetization curve with a subsequent diminution in the amplification thereof.

14. In a telephone system, the combination with an input circuit carrying received telephone currents, of a dynamo-electric generator, means for driving said generator, a telephone receiver responsive to the output circuit of said generator, means for normally exciting said generator to cause the same to deliver a current incapable of audibly affecting said telephone receiver, and means responsive to said input circuit for varying the excitation of said generator, said generator having a magnetizable magnetic circuit or circuits of such dimensions, with respect to the exciting fluxes, that saturation conditions are obtained with extremely large received currents.

15. A system for amplifying received signal current comprising a source of unidirectional signal current, a dynamo-electric machine, a source of power operating the rotor of the machine, a steady source of excitation for said machine, and means affected by the unidirectional signal current for producing a change in magnetic flux in the machine to effect current output, said machine having a magnetizable magnetic circuit or circuits of such dimensions with respect to the exciting fluxes, that saturation conditions are obtained with extremely large received currents.

In testimony whereof, I have hereunto subscribed my name this 26th day of February, 1921.

RALPH E. MARBURY.